(12) United States Patent
Delbosc et al.

(10) Patent No.: US 12,071,250 B2
(45) Date of Patent: Aug. 27, 2024

(54) ELECTRIC ARCHITECTURE FOR HYBRID PROPULSION

(71) Applicants: SAFRAN, Paris (FR); SAFRAN AIRCRAFT ENGINES, Paris (FR); SAFRAN ELECTRICAL & POWER, Blagnac (FR)

(72) Inventors: Philippe Delbosc, Blagnac (FR); Anne Lienhardt, Moissy-Cramayel (FR); Clement Dupays, Moissy-Cramayel (FR); Christophe Viguier, Moissy-Cramayel (FR); Sonia Dhokkar, Blagnac (FR)

(73) Assignees: SAFRAN, Paris (FR); SAFRAN AIRCRAFT ENGINES, Paris (FR); SAFRAN ELECTRICAL & POWER, Blagnac (FR)

( * ) Notice: Subject to any disclaimer, the term of this patent is extended or adjusted under 35 U.S.C. 154(b) by 707 days.

(21) Appl. No.: 17/282,549

(22) PCT Filed: Oct. 1, 2019

(86) PCT No.: PCT/FR2019/052322
§ 371 (c)(1),
(2) Date: Apr. 2, 2021

(87) PCT Pub. No.: WO2020/070438
PCT Pub. Date: Apr. 9, 2020

(65) Prior Publication Data
US 2021/0347491 A1 Nov. 11, 2021

(30) Foreign Application Priority Data

Oct. 4, 2018 (FR) ...................... 1859208

(51) Int. Cl.
*B64D 27/24* (2024.01)
*B64D 27/02* (2006.01)
(Continued)

(52) U.S. Cl.
CPC ................ *B64D 27/24* (2013.01); *H02J 1/14* (2013.01); *H02J 7/345* (2013.01); *B64D 27/026* (2024.01); *H02J 2310/44* (2020.01)

(58) Field of Classification Search
CPC .............. B64D 27/24; B64D 2027/026; B64D 27/16; B64D 2221/00; B64D 41/007;
(Continued)

(56) References Cited

U.S. PATENT DOCUMENTS

2006/0061213 A1 3/2006 Michalko
2010/0270858 A1* 10/2010 Foch ...................... F01D 15/10
307/9.1

(Continued)

FOREIGN PATENT DOCUMENTS

EP 2 974 964 A1 1/2016
EP 3 276 774 A1 1/2018
(Continued)

OTHER PUBLICATIONS

International Search Report issued on Jan. 28, 2020 in PCT/FR2019/052322 filed on Oct. 1, 2019, 2 pages.
(Continued)

*Primary Examiner* — Antony M Paul
(74) *Attorney, Agent, or Firm* — Oblon, McClelland, Maier & Neustadt, L.L.P.

(57) ABSTRACT

An aircraft with hybrid thermal/electrical propulsion includes a turbomachine; a first electrical source; a second electrical source equipped with an electrical energy storage device; a non-propulsion electrical distribution network; a low-voltage electrical distribution network; and a propulsion
(Continued)

electrical distribution network. The three electrical distribution networks are electrically supplied by the first and second electrical sources and electrically interconnected by static converters.

14 Claims, 1 Drawing Sheet

(51) Int. Cl.
*H02J 1/14* (2006.01)
*H02J 7/34* (2006.01)

(58) Field of Classification Search
CPC .... B64D 41/00; B60L 11/001; B60L 2200/10; B60L 50/61; B60L 1/02; B60L 1/20; B60L 2240/36; B60L 50/60; B60L 2210/30; B60L 2210/40; B60L 3/003; B60L 53/24; B60L 2220/42; B60L 3/0092; B60L 50/10; B60L 50/40; G08G 5/0034; H02J 7/345; H02J 1/14; B64C 11/44; H02P 27/06; H02P 27/04; H02P 9/00; H02P 2101/30; H02P 2101/25; H02P 9/006; H02P 9/04
See application file for complete search history.

(56) References Cited

U.S. PATENT DOCUMENTS

| 2014/0197681 A1 | 7/2014 | Iwashima et al. |
| 2016/0016670 A1 | 1/2016 | Sautreuil et al. |
| 2016/0083106 A1 | 3/2016 | Lebrun et al. |
| 2016/0236790 A1* | 8/2016 | Knapp .................. B64C 11/44 |
| 2018/0029721 A1 | 2/2018 | Mariotto et al. |

FOREIGN PATENT DOCUMENTS

| FR | 3 004 701 A1 | 10/2014 |
| RU | 2 232 109 C1 | 7/2004 |
| RU | 2 646 012 C2 | 2/2018 |
| RU | 2 655 183 C2 | 5/2018 |
| WO | WO 2014/174207 A1 | 10/2014 |

OTHER PUBLICATIONS

French Preliminary Search Report (with English translation of Categories of Cited Documents) issued on Jun. 5, 2019 in French Application 1859208 filed on Oct. 4, 2018, 3 pages.

* cited by examiner

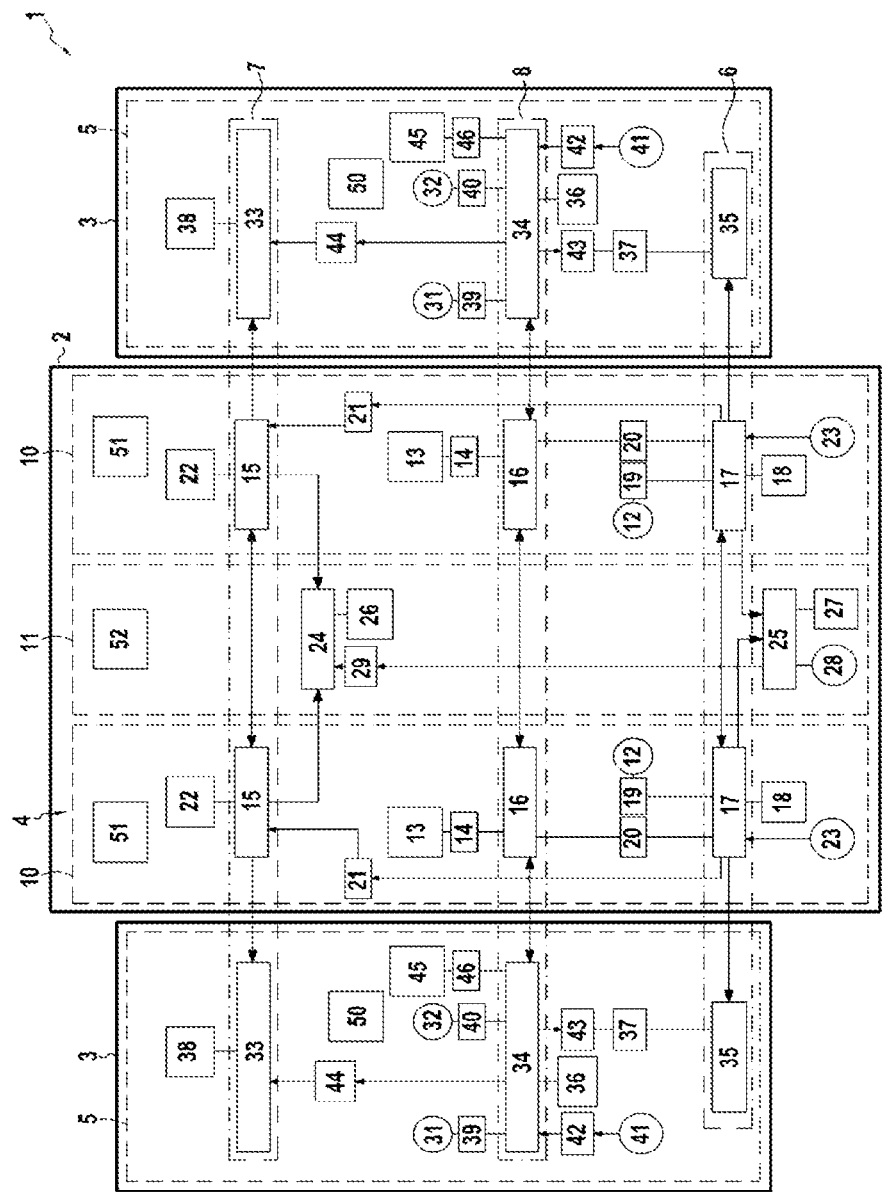

ELECTRIC ARCHITECTURE FOR HYBRID PROPULSION

BACKGROUND OF THE INVENTION

The invention relates to the hybridization of an aircraft propulsion system, and more particularly to the design of an electrical system interfaced with the aircraft and at least a turbomachine for providing a hybrid thermal/electrical propulsion.

More and more of these aircrafts are operating with hybrid propulsion systems, that is to say with a system comprising a turbomachine, at least an electrical generator and at least a battery, because the purely electrical systems operating only from a battery are viable only for transporting a load over a short distance like those on the intra-urban market, the battery life, linked to the low energy density of the batteries compared to the battery life offered by the fuel on-board an aircraft tank to supply turbomachines, not being sufficient for the other markets, such as the short-medium haul market for example.

OBJECT AND SUMMARY OF THE INVENTION

The invention aims at providing an electrical system of an aircraft interconnecting the energy sources available in the turbomachines and the body of the aircraft and allowing providing or taking off a power monitored with one or more electrical machines on the high-pressure and low-pressure shafts of a turbomachine, ensuring the compatibility of all these functions related to the propulsion with the functions of providing other energy needs and ensuring optimized management of all these operations of taking off and providing energies with different energy sources and energy storage means.

In a first object of the invention, there is proposed an aircraft with hybrid thermal/electrical propulsion comprising at least a turbomachine, a first electrical source, a second electrical source equipped with electrical energy storage means, a non-propulsion electrical distribution network and a low-voltage electrical distribution network.

According to a general characteristic of the invention, the aircraft further comprises a propulsion electrical distribution network, the three networks being electrically supplied by the first and second electrical sources and electrically interconnected by static converters.

The propulsion electrical distribution network is intended to supply the high-power equipment, in particular the equipment related to the propulsion system. This network has the highest voltage level. The use of this distribution network only for the high-power equipment allows minimizing the current to be provided, and consequently allows decreasing the number of cables with a large section and thus reducing the space requirement and the mass due to the electrical cables.

The propulsion electrical distribution network is preferably of the DC type and of a voltage level depending on the powers involved: 540 V, 750 V, 1,000 V, 1,500 V, 3,000 V. The voltage level is defined based on the following parameters: power, current, topology and electrical architecture and mass. The increase of the on-board electrical power has a significant impact on the mass. The choice of voltage level is preferably the optimum compromise between the energy efficiency and the mass of the electrical system.

The non-propulsion electrical distribution network is intended to supply electricity to the intermediate power equipment, that is to say mainly the equipment related to the non-propulsion system also referred to as "aircraft" loads. Preferably, this network is of the DC type.

The non-propulsion electrical distribution network has an intermediate voltage level (for example 540 VDC) lower than the voltage level of the propulsion electrical distribution network.

The low-voltage electrical distribution network is intended to supply electricity to the low-power loads of the turbomachines or the aircraft. This network is typically of the DC type, for example on the order of 28 VDC.

Advantageously, the aircraft can further comprise a main electrical system mounted in the body of the aircraft and, for the or each turbomachine of the aircraft, a local electrical system mounted in the turbomachine.

Preferably, the local electrical system comprises a first electrical machine mechanically coupled to a low-pressure shaft of the turbomachine, at least a second electrical machine mechanically coupled to a high-pressure shaft of the turbomachine, power converters, such as reversible AC-DC converters and a local electronic control unit configured to control the supply to the local loads of the turbomachine based on the available electrical sources of the aircraft, the first and second electrical machines being first electrical sources when they operate in generator mode and local loads when they operate in motor mode, in particular for the start-up.

The first electrical machine can be mechanically coupled to a low-pressure shaft of the turbomachine in direct connection or by means of a reduction box, that is to say a gear system.

By available electrical sources, it is meant the electrical sources delivering a supply current.

The power converters allow piloting the engines during the phases of operation in motor mode and ensuring the regulation of the network voltage during the phases of electrical energy generation.

The local electrical system can advantageously comprise an electrical outlet allowing the connection of an external electrical source.

The electrical outlet of the local electrical system allows rotating the turbomachine equipped with this local electrical system at low speed, for example without starting the turbomachine, using ground equipment.

The electrical outlet can be associated with an AC-DC converter in the event the external electrical source coupled to the electrical outlet is not DC source.

Advantageously, the local electrical system can comprise a first local electrical distribution casing connected to the low-voltage electrical distribution network, a second local electrical distribution casing connected to the propulsion electrical distribution network, the first and second local electrical distribution casings ensuring the interconnections between the electrical sources of the aircraft and the interconnections between the local loads of the turbomachine or with the loads of the main electrical system.

Advantageously, the local electrical system can further comprise a unidirectional current converter between the second local electrical distribution casing and the first local electrical distribution casing in order to allow the supply to the local low-voltage loads.

The local electrical system can advantageously further comprise a local energy storage means associated with a DC/DC converter.

Preferably, the main electrical system comprises two first subsystems and a second backup subsystem, each first subsystem comprising a first main electrical distribution casing connected to the low-voltage electrical distribution network, a second main electrical distribution casing connected to the propulsion electrical distribution network, a third main electrical distribution casing connected to the non-propulsion electrical distribution network, the main electrical distribution casings ensuring the interconnections between the available electrical sources of the aircraft, the loads of the main electrical system and the electrical subsystems.

Advantageously, each first electrical subsystem can further comprise a unidirectional converter between the third main electrical distribution casing and the first main electrical distribution casing, and a bidirectional converter between the second main electrical distribution casing and the third main electrical distribution casing, in order to allow the supply to the loads in different configurations.

Preferably, each first electrical subsystem comprises an auxiliary electrical machine mechanically coupled to an auxiliary power group and associated with a reversible AC-DC power converter, and a main electronic control unit configured to control the supply to the loads of the first subsystem based on the available electrical sources of the aircraft, the auxiliary electrical machine being a first electrical source when it operates in generator mode and a local load when it operates in motor mode.

Advantageously, each first electrical subsystem can comprise an electrical outlet allowing the connection of an external electrical source to ensure the functions of supplying the aircraft and the engines when no electrical source internal to the aircraft is available.

Each first electrical subsystem can advantageously further comprise an energy storage means associated with a DC/DC converter forming a second electrical source.

The storage means can be pooled for the purposes of hybridization of the turbomachine and the purposes of non-propulsion loads or segregated to dedicate part thereof to the non-propulsion loads and part to the hybridization. The storage means is also used to allow reconfigurations without load break (No Break Power Transfer function).

The converter, for example a DC/DC converter, allows keeping the voltage constant on the network side despite a large variation on the storage device side and allows ensuring the load of the storage device if this energy source is a battery. This architecture offers the opportunity to adapt the voltage level at the network to ensure the sharing power mode.

Preferably, the second electrical subsystem comprises a first backup electrical distribution casing connected to the low-voltage electrical distribution network, a second backup electrical distribution casing connected to the non-propulsion electrical distribution network, the backup electrical distribution casings being supplied by said at least first and/or second electrical sources when at least one of them is available, and the backup electrical distribution casings ensuring the interconnections between the available electrical sources of the aircraft and the loads of the second electrical subsystem.

Advantageously, the first and second backup electrical distribution casings can be each supplied by a backup generator or by another electrical source in direct connection with the backup electrical distribution casing.

Advantageously, the second electrical subsystem can comprise a backup electronic control unit configured to control the supply to the loads of the second subsystem based on the available electrical sources of the aircraft.

BRIEF DESCRIPTION OF THE DRAWINGS

The invention will be better understood upon reading the following, by way of indication but without limitation, with reference to the appended drawing in which the single FIGURE represents an electrical architecture of an aircraft according to one embodiment of the invention.

DETAILED DESCRIPTION OF EMBODIMENTS

The single FIGURE represents an electrical architecture of an aircraft with hybrid thermal/electrical propulsion according to one embodiment of the invention.

The aircraft 1 comprises a body 2 including a fuselage and two wings, and two turbomachines 3. The body 2 of the aircraft 1 comprises a main electrical system 4 whose components are mounted in the body 2 of the aircraft 1, and each turbomachine 3 comprises a local electrical system 5 whose components are mounted in a nacelle of the turbomachine 3.

Furthermore, the aircraft 1 comprises a non-propulsion electrical distribution network 6, a low-voltage electrical distribution network 7 and a propulsion electrical distribution network 8 which are electrically interconnected by static converters.

The three electrical distribution networks 6 to 8 are transverse to the electrical systems 4 and 5, that is to say each of the three electrical distribution networks 6 to 8 is implanted in the main electrical system 4 and in the local electrical systems 5. Thus, each of the three electrical distribution networks 6 to 8 connects the main electrical system 4 to the local electrical systems 5.

The propulsion electrical distribution network is intended to supply the high-power equipment, in particular the equipment related to the propulsion system. This network has the highest voltage level. The propulsion electrical distribution network is preferably of the DC type and of a voltage level depending on the powers involved and which may be on the order of several hundred volts to several thousand volts.

The non-propulsion electrical distribution network is intended to supply electricity to the intermediate power equipment, that is to say mainly the equipment related to the non-propulsion system also referred to as "aircraft" loads. Preferably, this network is of the DC type. The non-propulsion electrical distribution network has an intermediate voltage level (for example 540 VDC) lower than the voltage level of the propulsion electrical distribution network.

The low-voltage electrical distribution network is intended to supply electricity to the low-power loads of the turbomachines or the aircraft. This network is typically of the DC type, for example on the order of 28 VDC.

The main electrical system 4 of the aircraft 1 comprises two basic subsystems 10 and a backup subsystem 11.

Each subsystem comprises an auxiliary electrical machine 12 forming a first electrical source and an energy storage device 13 associated with a DC-DC converter (DC/DC) 14 forming a second electrical source.

The DC/DC converter 14 allows keeping the voltage constant on the network side despite a large variation on the storage device side 13 and allows ensuring the load of the storage device 13 if this energy source is a battery for example.

The energy storage device 13 and its DC/DC converter 14 can be pooled for the purposes of hybridization of the turbomachine and the purposes of the non-propulsion loads or segregated in two parts to dedicate part thereof to the non-propulsion loads and part to the hybridization, for example using two energy storage devices and two DC/DC converters.

Each basic subsystem 10 comprises a low-voltage electrical distribution casing 15 connected to the low-voltage electrical distribution network 7, a propulsion electrical distribution casing 16 connected to the propulsion electrical distribution network 8 and a non-propulsion electrical distribution casing 17 connected to the non-propulsion electrical distribution network 6.

The electrical distribution casings 15 to 17 of each basic subsystem 10 ensure the interconnections between the available electrical sources of the aircraft such as, for example, the auxiliary electrical machines 12 and the energy storage devices 13 of the main electrical system 4, the electrical subsystems 10 and 11, the local electrical systems 5, and the non-propulsion loads 18 and the low-voltage loads 22 of the main electrical system 4.

The non-propulsion electrical distribution casing 17 of each basic electrical subsystem 10 is electrically connected to the auxiliary electrical machine 12 via an alternating current-direct current (AC/DC) converter 19.

Each basic electrical subsystem 10 further comprises a first DC/DC converter 20 coupled between the propulsion electrical distribution casing 16 and the non-propulsion electrical distribution casing 17, and a second DC/DC converter 21 coupled between the non-propulsion electrical distribution casing 17 and the low-voltage electrical distribution casing 15. The energy provided by the auxiliary electrical machine 12 can thus be transferred to the propulsion electrical distribution casing 16 via the first DC/DC converter 20 and to the low-voltage electrical distribution casing 15 via the second DC/DC converter 21 to supply the low-voltage loads 22 of the main electrical system 4.

The first DC/DC converter 20 is bidirectional in order to be able to transfer electrical energy in both directions between the propulsion electrical distribution casing 16 and the non-propulsion electrical distribution casing 17, that is to say between the propulsion electrical distribution network 8 and the non-propulsion electrical distribution network 6. The second DC/DC converter 21, on the other hand, is unidirectional current.

In one variant, the AC/DC converter 19 can be coupled between the auxiliary electrical machine 12 and the propulsion electrical distribution casing 16, the energy delivered by the auxiliary electrical machine 12 being able to be transferred to the non-propulsion electrical distribution casing 17 via the first DC/DC converter 20, then to the low-voltage electrical distribution casing 15 via the second DC/DC converter 21.

The auxiliary electrical machine 12 is mechanically linked to the auxiliary power group. The auxiliary electrical machine 12 and the associated AC/DC converter 19 ensure the starting of the auxiliary power group and supply the non-propulsion loads 18 of the main electrical system 4, called "aircraft loads", but can also provide complementary power onto the propulsion electrical distribution network 8.

Each basic electrical subsystem 10 also comprises an electrical outlet 23 allowing the connection of an external electrical source to ensure the supply to the different loads of the aircraft 1 and of the engines 3 when there is no electrical source internal to the aircraft 1 available.

The backup subsystem 11 comprises a backup low-voltage electrical distribution casing 24 connected to the low-voltage electrical distribution network 7 and a backup non-propulsion electrical distribution casing 25 connected to the non-propulsion electrical distribution network 6. The backup electrical distribution casings 24 and 25 supply only the low-voltage backup loads 26 and the non-propulsion backup loads 27 of the main electrical system 4.

The backup electrical distribution casings 24 and 25 are supplied by one of the electrical machines 12 and one of the energy storage devices 13 of the two basic subsystems 10 when at least one of these electrical sources is available. The backup electrical distribution casings thus ensure the interconnections between the available electrical sources of the main electrical system 4 and the backup loads 26 and 27.

In the embodiment illustrated in the single FIGURE, the backup subsystem also comprises an additional backup generator 28 electrically connected to the backup non-propulsion electrical distribution casing 25 which is electrically coupled to the backup low-voltage electrical distribution casing 24 via a unidirectional DC/DC converter 29 to supply the backup low-voltage electrical distribution casing 24.

The additional backup generator 28 can be driven by a drive means such as an auxiliary electrical machine 12, for example if the need for power is significant, or a ram air turbine if the power required is limited.

In one variant, the additional backup generator 28 can be replaced by another on-board source with a direct connection to the backup non-propulsion electrical distribution casing 25, that is to say without going through one of the electrical distribution casings 15 to 17 of a basic subsystem 10. The other on-board source can be one of the energy storage devices 13 or part of these storage devices, or one of the auxiliary electrical machines 12.

Each local electrical system 5 comprises a first electrical machine 31 mechanically coupled to a low-pressure shaft of the turbomachine 3 either directly or by means of a reduction box, that is to say a gear system, and a second electrical machine 32 mechanically coupled to a high-pressure shaft of the turbomachine 3 either directly or by means of a reduction box, that is to say a gear system.

In one variant, each local electrical system 5 can comprise two second electrical machines mechanically coupled to a high-pressure shaft, or an electrical machine including two independent stators associated with two AC/DC converters, or an electrical machine including a single stator associated with two AC/DC converters.

Each local electrical system 5 further comprises an energy storage device 45 associated with a DC-DC electrical converter 46.

The first and second electrical machines 31 and 32 of the local electrical systems 5 form a first electrical source of the aircraft while the energy storage devices 45 associated with their DC-DC converter 46 form a second electrical source of the aircraft.

Each local electrical system 5 further comprises a local low-voltage electrical distribution casing 33 connected to the low-voltage electrical distribution network 7, a local propulsion electrical distribution casing 34 connected to the propulsion electrical distribution network 8, and a local non-propulsion electrical distribution casing 35 connected to the non-propulsion electrical distribution network 6.

The local electrical distribution casings 33 to 35 ensure, with the electrical distribution casings 15 to 17 of the basic subsystems 10, the interconnections between the available electrical sources of the turbomachines 3 or of the body 2 of the aircraft, such as the electrical machines 12, 31 and 32 and the energy storage devices 13 and 45, and the interconnections between the local propulsion 36, non-propulsion 37 and low-voltage 38 loads of the local electrical system 5, or with the loads 18, 22, 26 and 27 of the main electrical system 4.

The backup electrical distribution casings 24 and 25 can also be supplied by one of the electrical machines 31 and 32 of the local electrical systems when at least one of these electrical sources is available.

Each local electrical system 5 also comprises two reversible AC/DC power converters 39 and 40 respectively connected between the first electrical machine 31 and the local propulsion electrical distribution casing 34 and between the second electrical machine 32 and the local propulsion electrical distribution casing 34. The AC/DC power converters 39 and 40 are configured to pilot the turbomachines 3 during the phases of power injection or the phases of operation in motor mode, such as the start-up phase and to ensure the regulation of the voltage of the propulsion electrical distribution network 8 during the generation phases.

Each local electrical system 5 also comprises an electrical outlet 41 allowing rotating the turbomachine 3 at low speed, for example without starting the turbomachine 3, using ground equipment.

In the embodiment illustrated in the single FIGURE, the electrical outlet 41 is coupled to the local propulsion electrical distribution casing 34 via an AC/DC converter 42 in the event the external electrical source coupled to the electrical outlet is not DC source.

Each local electrical system 5 also comprises a first unidirectional DC/DC converter 43 coupled between the local propulsion electrical distribution casing 34 and the local propulsion loads 36 to supply the local propulsion loads from the propulsion electrical distribution network 8, and a second unidirectional DC/DC converter 44 between the local propulsion electrical distribution casing 34 and the local low-voltage electrical distribution casing 33 to supply the local low-voltage loads 38 of the local electrical system 5.

Each local electrical distribution system 5 comprises a local electronic control unit 50 configured to control the supply to the local loads 36 to 38 of the turbomachine 3 based on the available electrical sources 12, 13, 31, 32 and 45 of the aircraft 1.

Each basic electrical subsystem 10 comprises a basic electronic control unit 51 configured to control the supply to the loads 18 and 22 of the basic subsystem 10 based on the available electrical sources 12, 13, 31, 32 and 54 of the aircraft 1.

Finally, each backup electrical subsystem 11 comprises a backup electronic control unit 52 configured to control the supply to the backup loads 26 and 27 based on the available electrical sources 12, 13, 28, 31, 32 and 45 of the aircraft 1.

The invention thus offers an electrical system interfaced with the aircraft and the turbomachine(s) allowing providing or taking off a power monitored with one or more electrical machines on the high-pressure and low-pressure shafts of the turbomachine, ensuring the compatibility of all these functions related to the propulsion with the functions of providing other energy needs and ensuring optimized management of all these operations of taking off and providing energies with different energy sources and energy storage means according to a mission profile. The electrical architecture offers a certain additional flexibility thanks to the given possibility of taking off and injecting energy according to the operating mode, which allows reducing the on-board power at the aircraft.

The invention claimed is:

1. An aircraft with hybrid thermal/electrical propulsion comprising:
   a turbomachine,
   a first electrical source,
   a second electrical source equipped with electrical energy storage means,
   a non-propulsion electrical distribution network,
   a low-voltage electrical distribution network,
   a propulsion electrical distribution network, the three electrical distribution networks being electrically supplied by the first and second electrical sources and electrically interconnected by static converters,
   a main electrical system mounted in the body of the aircraft, and
   for the turbomachine of the aircraft, a local electrical system mounted in the turbomachine.

2. The aircraft according to claim 1, wherein the local electrical system comprises a first electrical machine mechanically coupled to a low-pressure shaft of the turbomachine, a second electrical machine mechanically coupled to a high-pressure shaft of the turbomachine, reversible AC-DC power converters, and a local electronic control unit configured to control the supply to local loads of the turbomachine based on available electrical sources of the aircraft, the first and second electrical machines being first electrical sources when the first and second electrical machines operate in generator mode and local loads when the first and second electrical machines operate in motor mode.

3. The aircraft according to claim 1, wherein the local electrical system comprises an electrical outlet allowing the connection of an external electrical source.

4. The aircraft according to claim 1, wherein the local electrical system comprises a first local electrical distribution casing connected to the low-voltage electrical distribution network, a second local electrical distribution casing connected to the propulsion electrical distribution network, the first and second local electrical distribution casings ensuring the interconnections between the first and second electrical sources of the aircraft and the interconnections between local loads of the turbomachine or with loads of the main electrical system.

5. The aircraft according to claim 4, wherein the local electrical system further comprises a unidirectional static current converter between the second local electrical distribution casing and the first local electrical distribution casing.

6. The aircraft according to claim 1, wherein the local electrical system further comprises a local energy storage means associated with a DC/DC converter forming the second electrical source.

7. The aircraft according to claim 1, wherein the main electrical system comprises two first electrical subsystems and a second backup electrical subsystem, each first electrical subsystem comprising a first main electrical distribution casing connected to the low-voltage electrical distribution network, a second main electrical distribution casing connected to the propulsion electrical distribution network, a third main electrical distribution casing connected to the non-propulsion electrical distribution network, the main electrical distribution casings ensuring the interconnections between available electrical sources of the aircraft, loads of the main electrical system and the first electrical subsystems.

8. The aircraft according to claim 7, wherein each first electrical subsystem further comprises a unidirectional static current converter between the third main electrical distribution casing and the first main electrical distribution casing, and a bidirectional static current converter between the second main electrical distribution casing and the third main electrical distribution casing.

9. The aircraft according to claim 7, wherein each first electrical subsystem comprises an auxiliary electrical machine mechanically coupled to an auxiliary power group and associated with a reversible AC-DC power converter, and a main electronic control unit configured to control supply to loads of the first subsystem based on available electrical sources of the aircraft, the auxiliary electrical machine being a first electrical source when the auxiliary electrical machine operates in generator mode and a local load when the auxiliary electrical machine operates in motor mode.

10. The aircraft according to claim 7, wherein each first electrical subsystem comprises an electrical outlet allowing connection of an external electrical source.

11. The aircraft according to claim 7, wherein each first electrical subsystem further comprises an energy storage means associated with a DC-DC converter forming the second electrical source.

12. The aircraft according to claim 7, wherein the second electrical subsystem comprises a first backup electrical distribution casing connected to the low-voltage electrical distribution network, a second backup electrical distribution casing connected to the non-propulsion electrical distribution network, the backup electrical distribution casings being supplied by said at least first and/or second electrical sources when at least one of the first and/or second electrical sources is available, and the backup electrical distribution casings ensuring interconnections between available electrical sources of the aircraft and loads of the second electrical subsystem.

13. The aircraft according to claim 12, wherein the first and second backup electrical distribution casings are each supplied by a backup generator or by another electrical source in direct connection with the second backup electrical distribution casing.

14. The aircraft according to claim 12, wherein the second electrical subsystem comprises a backup electronic control unit configured to control supply to the loads of the second electrical subsystem based on the available electrical sources of the aircraft.

* * * * *